(12) United States Patent
Kramarenko et al.

(10) Patent No.: US 9,007,426 B2
(45) Date of Patent: Apr. 14, 2015

(54) COMPARISON-BASED SELECTION OF VIDEO RESOLUTIONS IN A VIDEO CALL

(71) Applicants: Valentina Iqorevna Kramarenko, Milton (CA); Boris Rozinov, Richmond Hill (CA); Matthew David Douglas Williams, Burlington (CA)

(72) Inventors: Valentina Iqorevna Kramarenko, Milton (CA); Boris Rozinov, Richmond Hill (CA); Matthew David Douglas Williams, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 224 days.

(21) Appl. No.: 13/645,491

(22) Filed: Oct. 4, 2012

(65) Prior Publication Data
US 2014/0098182 A1    Apr. 10, 2014

(51) Int. Cl.
*H04M 7/14* (2006.01)
*H04N 7/14* (2006.01)
*H04N 21/258* (2011.01)
*H04N 21/6336* (2011.01)
*H04N 21/6379* (2011.01)

(52) U.S. Cl.
CPC ......... *H04N 7/141* (2013.01); *H04N 21/25825* (2013.01); *H04N 21/6336* (2013.01); *H04N 21/6379* (2013.01)

(58) Field of Classification Search
USPC ............ 348/14.01–14.12, E07.081, E07.083, 348/E07.087, E07.077, 159; 725/94
See application file for complete search history.

(56) References Cited

U.S. PATENT DOCUMENTS

| | | | |
|---|---|---|---|
| 5,774,674 A | 6/1998 | Gutmann et al. | |
| 6,453,336 B1 * | 9/2002 | Beyda et al. | 709/204 |
| 7,400,889 B2 | 7/2008 | Balasubramanian et al. | |
| 7,583,286 B2 | 9/2009 | Brooksby et al. | |
| 7,710,449 B2 | 5/2010 | Amiel et al. | |
| 7,743,135 B2 | 6/2010 | Azuma | |
| 8,134,587 B2 | 3/2012 | Niu | |
| 8,145,770 B2 | 3/2012 | Hagendorf | |

(Continued)

FOREIGN PATENT DOCUMENTS

WO    2009112547    9/2009

OTHER PUBLICATIONS

Extended European search report pursuant to Rule 62 EPC, the European search report (R. 61 EPC) or the partial European search report/Declaration of no search (r. 63 EPC) and the European search opinion for Application No. 12188894.5, dated Apr. 4, 2013, 8 pages.

(Continued)

*Primary Examiner* — Binh Tieu
(74) *Attorney, Agent, or Firm* — Fish & Richardson P.C.

(57) ABSTRACT

A method that includes determining input-resolution parameters for an input resolution, receiving first and second output resolutions from an electronic device, wherein the first output resolution includes first output-resolution parameters and the second output resolution includes second output-resolution parameters, calculating a first value by using the input-resolution parameters and the first output-resolution parameters, calculating a second value by using the input-resolution parameters and the second output-resolution parameters, selecting one of the first and second output resolutions based on a comparison between the first and second values, providing the selected output resolution to the electronic device, and receiving a video stream from the electronic device, wherein the video stream has a resolution corresponding to the selected output resolution.

24 Claims, 5 Drawing Sheets

(56) References Cited

U.S. PATENT DOCUMENTS

| | | | |
|---|---|---|---|
| 8,179,420 B2 | 5/2012 | Gaylord | |
| 8,694,655 B2 * | 4/2014 | Shitrit | 709/228 |
| 2009/0245180 A1 | 10/2009 | Wu | |
| 2009/0300692 A1 * | 12/2009 | Mavlankar et al. | 725/94 |
| 2009/0303310 A1 | 12/2009 | Zhang et al. | |
| 2010/0118110 A1 | 5/2010 | Choi | |
| 2011/0116505 A1 | 5/2011 | Hymus et al. | |
| 2011/0249078 A1 | 10/2011 | Abuan et al. | |
| 2011/0305170 A1 | 12/2011 | Lai et al. | |
| 2012/0113113 A1 * | 5/2012 | Hong | 345/419 |
| 2012/0150953 A1 | 6/2012 | Costanzo et al. | |
| 2012/0154509 A1 * | 6/2012 | Erb | 348/14.03 |
| 2012/0176469 A1 | 7/2012 | Moore et al. | |
| 2013/0050392 A1 * | 2/2013 | Chiang | 348/14.01 |
| 2014/0082661 A1 * | 3/2014 | Krahnstoever et al. | 725/32 |

OTHER PUBLICATIONS

Rosenberg, J., et al., "SIP RFC (3621) Navigator and Clarifier Light", Network Working Group, Jun. 1, 2002, XP007915526, pp. 1-253.

Honko, H., et al., "SDP Syntax for H.263 Options", Internet Engineering Task Force, Feb. 1, 1998, XP040417400, 4 pages.

* cited by examiner

COMPARISON-BASED SELECTION OF VIDEO RESOLUTIONS IN A VIDEO CALL

FIELD

Example embodiments disclosed herein relate generally to videocalling in electronic devices.

BACKGROUND

An increasing number of electronic devices today come equipped with cameras, displays, audio, and communication capabilities, and are therefore capable of participating in a videocalling or videoconferencing. Such devices include, but are not limited to, desktop, laptop or netbook computers, smart phones, feature phones, tablet computers, TVs, as well as electronic devices designed specifically for videocalling or videoconferencing. Given the growing variety of such devices, interoperability becomes an important issue in the videocalling field.

DETAILED DESCRIPTION

Reference will now be made in detail to various embodiments, examples of which are illustrated in the accompanying drawings. Wherever possible, the same reference numbers will be used throughout the drawings to refer to the same or like parts.

Electronic devices can be developed for different purposes and can have different screen sizes and display resolutions. In the past, most devices used to comply with resolution standards, such as VGA, CIF, etc. Since then, the number of electronic device manufacturers and various device models has grown exponentially, and today a device participating in a videocalling or videoconference cannot anymore assume that the other participant device is compliant with any particular relevant standard. At the same time, it can be desirable for the participants to agree on a preferable resolution of the video stream to be transmitted, taking into account participating electronic devices' display resolutions and scaling capabilities, network conditions, and a variety of other factors. In some instances, the agreed resolution will be a function of the highest quality display capability of the receiving device. In other instances, the agreed resolution will be a function of a display capability of the receiving device that is not the highest quality because of, for example, network conditions at the time of transmission to the receiving device.

RFC 3261 describes a Session Initiation Protocol (SIP), an application-layer control protocol for creating, modifying, and terminating sessions with one or more participants. It is designed for sessions such as Internet telephone calls, multimedia distribution, and multimedia conferences. SIP provides the framework for the videocalling parties to exchange information, but for the most part leaves it to the developers to decide which information to exchange and how to process it.

In some embodiments, a method is provided that includes determining input-resolution parameters for an input resolution, receiving first and second output resolutions from an electronic device, wherein the first output resolution includes first output-resolution parameters and the second output resolution includes second output-resolution parameters, calculating a first value by using the input-resolution parameters and the first output-resolution parameters, calculating a second value by using the input-resolution parameters and the second output-resolution parameters, selecting one of the first and second output resolutions based on a comparison between the first and second values, providing the selected output resolution to the electronic device, and receiving a video stream from the electronic device, wherein the video stream has a resolution corresponding to the selected output resolution.

Figure 1A:
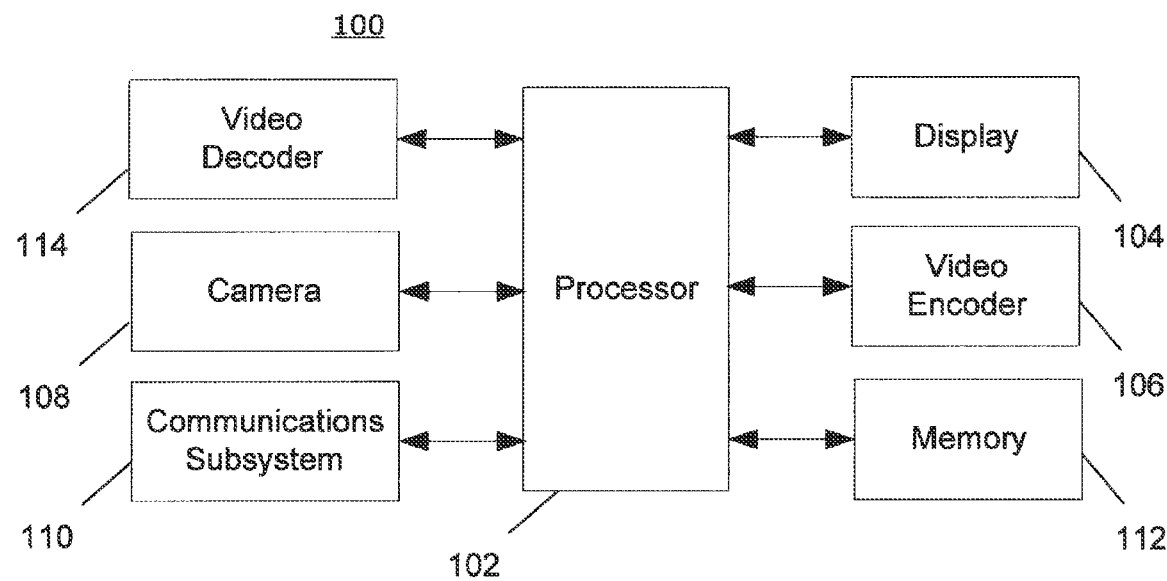
FIG. 1A is an example block diagram of an electronic device, consistent with embodiments disclosed herein.
Figure 1B:
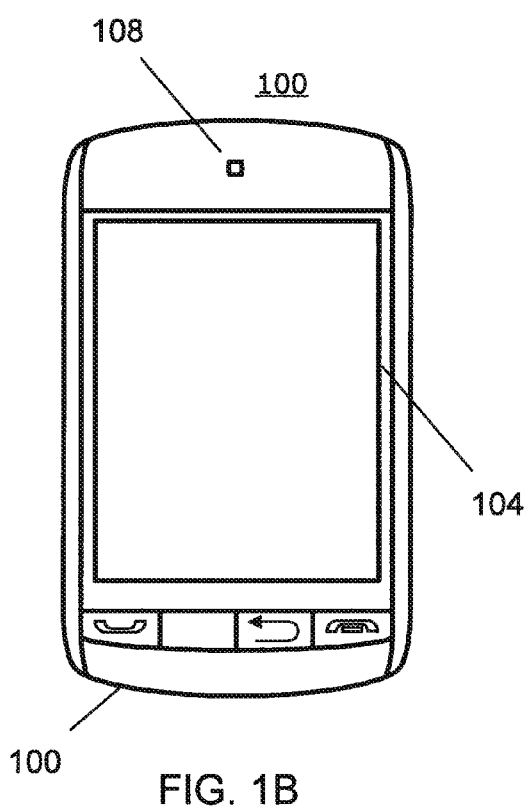
FIG. 1B is a front view of the electronic device in FIG. 1A, consistent with embodiments disclosed herein.

FIGS. 1A and 1B show a block diagram and a front view of an electronic device 100, respectively. Electronic device 100 can be any electronic device with communication capabilities and a display, such as a desktop, a laptop or a netbook computer, a smart phone, a feature phone, a touch-screen tablet, a high-end car, a TV, etc. Electronic device 100 can include, among other things, a processor 102, a display 104, a video encoder 106, a video decoder 114, a camera 108, a communications subsystem 110, and a memory 112.

Processor 102 can be a single or multiple processors (or one or more microprocessors), field programmable gate arrays (FPGAs), or digital signal processors (DSPs) capable of executing particular sets of instructions. Computer-readable instructions can be stored on a tangible non-transitory computer-readable medium (e.g., memory 112), such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Processor 102 interacts with other components of electronic device 100.

Display 104 can be used by electronic device 100 for displaying text, graphics, images, video, and so forth. Display 104 can be characterized by its "native resolution," the number of physical pixels the display is comprised of. For example, display 104 having a native resolution of "1024× 768" is comprised of 786,432 pixels arranged in a rectangle 1024 pixels wide and 768 pixels high.

Before electronic device 100 displays an image or a video stream on display 104, electronic device 100 can scale the video in a horizontal and/or vertical direction. For example, if the resolution (the picture size) of a video stream to be displayed is higher than the native resolution of display 104, electronic device 100 can "down-scale" the video stream to match the native resolution, and then display the down-scaled video stream. Similarly, if the resolution of the video stream is lower than the native resolution and the user, for example, desires to see the video in full-screen mode, the video stream can first be "up-scaled" to fit the native resolution, and then displayed on display 104. The scaling can be performed by a scaler (not shown), which can be implemented, for example, using any combination of one or more hardware and/or software modules.

Excessive scaling, however, can negatively affect the perceived quality of the displayed video stream. Scaling is also a computationally intensive and power-consuming task and can have a negative impact on the system performance. Furthermore, if the video stream is scaled horizontally and vertically using different scaling factors, the aspect ratio (the height-to-width ratio) of the original video will not be preserved and the displayed video can appear distorted. For example, if the resolution of the original video is 1920×1080 (aspect ratio of 16:9) and the native resolution of the receiving device's display is 1024×768 (aspect ratio of 4:3), in order to display the video in full-screen mode without cutting the frame or adding side bars, the video must be scaled horizontally by a factor of 1920/1024=1.875, and vertically by a factor of 1080/768=1.40625. Avoiding excessive scaling and scaling that does not preserve the original aspect ratio can result in better video quality (e.g., low-noise and free of distortions) as perceived by a user.

Camera 108 can be a CMOS camera, a CCD camera, or any other type of camera capable of capturing and outputting compressed or uncompressed image data such as still images and/or video clips. In some embodiments, electronic device 100 can include more than one camera, allowing the user to switch, during a videocalling or videoconference, from one camera to another, or to overlay video captured by one camera on top of video captured by another camera.

Memory 112 can include, for example, a volatile memory (e.g., RAM) and a non-volatile memory (e.g., flash memory). Memory 112 can store, for example, a video stream, such as a video stream received from another device or from camera 108, and compressed by video encoder 106.

Video encoder 106 can be a hardware and/or software module capable of compressing video data. Video encoder 106 can receive uncompressed video data from camera 108, memory 112, communication subsystem 110, or from any other local or remote source. Video encoder 106 can compress the uncompressed video data using any compression technique, such as Motion-JPEG, MPEG2, MPEG4, H.264, VC-1, etc. Video encoder 106 can output compressed video data, which can be stored on memory 112 or transmitted (streamed) to another electronic device 100 via communications subsystem 110.

Video decoder 114 can be a hardware and/or software module capable of decompressing video data. Video decoder 114 can receive compressed video data, for example, from another electronic device 100 via communications subsystem 110 and decompress the compressed video data. Electronic device 100 can then display the decompressed video data on display 104.

Communication subsystem 110 allows electronic device 100 to communicate with other electronic devices 100 using wired protocols (e.g., USB, Ethernet, etc.) and/or wireless protocols (e.g., Wi-Fi, Bluetooth, etc.). The communication can be direct or through a network, such as the local area network (LAN), wide area network (WAN), the Internet, etc. Communication subsystem 110 can support Internet-layer protocols such as IPv4 and IPv6, transport-layer protocols such as TCP and UDP, and any application-layer protocol implemented thereupon, such as SIP.

In addition to compressing the video data using video encoder 106, electronic device 100 can also scale the video data. The scaling can be performed, for example, by video encoder 106, or by another software or hardware module, before the compression takes place. The video data can be scaled to any resolution supported by electronic device 100. Electronic device 100 can have a predefined list or range of supported output resolutions, resolutions in which electronic device 100 can output video streams. Supported output resolutions can depend on the resolution of the original video stream.

Figure 2:
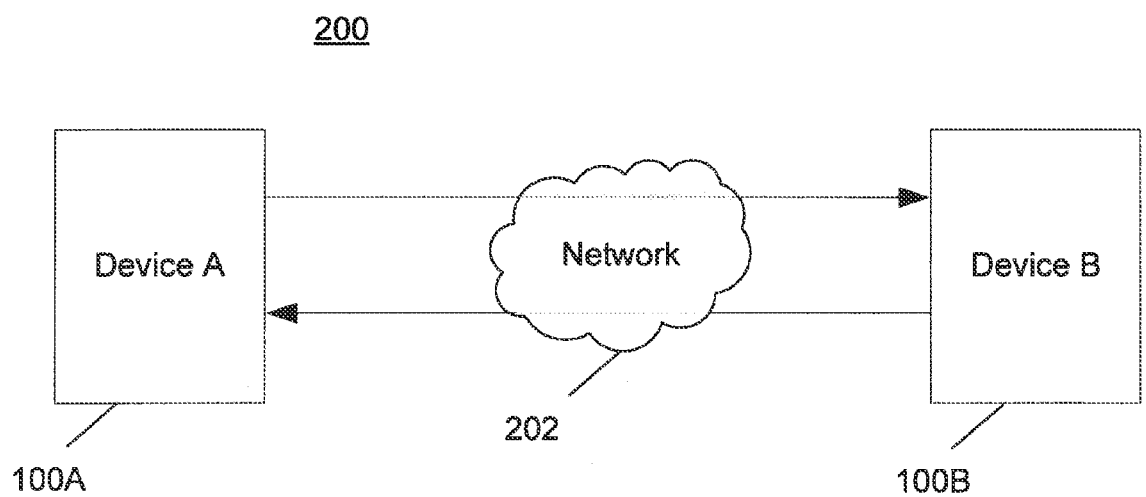
FIG. 2 is a schematic diagram of a videocalling system, consistent with embodiments disclosed herein.

FIG. 2 is a schematic diagram of a video communication system 200, in accordance with embodiments described herein. Video communication system 200 can include, among other things, a first electronic device 100A (hereinafter, "Device A"), a second electronic device 100B (hereinafter, "Device B"), and a network 202. Network 202 can be any type of network capable of transmitting video data, such as LAN, WAN, a cellular network (e.g., 3GPP, 3GPP2, 4G) and so forth. In some embodiments, network 202 can be omitted and the devices can communicate using any wired or wireless direct communication technology, for example, via Bluetooth.

Figure 3:
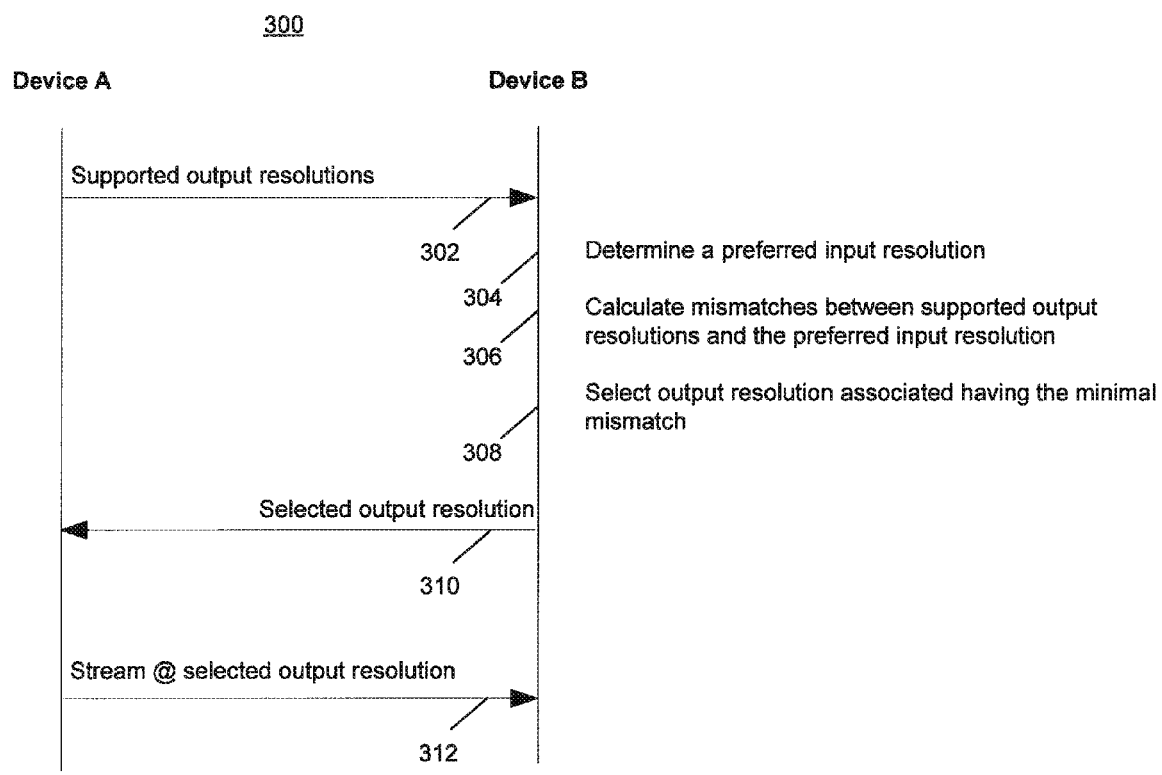
FIG. 3 is a time diagram of an example method for resolution selection in a one-way videocalling, consistent with embodiments disclosed herein.

FIG. 3 shows a time diagram of a resolution selection method 300 in a one-way videocalling, in accordance with embodiments described herein. Resolution selection method 300 or parts thereof can be implemented, for example, using SIP, or using any other protocol suitable for the data exchanges described herein.

In the example illustrated in FIG. 3, Device A intends to transmit a video stream to Device B. The video stream can be pre-stored in memory 112 of Device A or captured in real time by camera 108. The video stream can also be a real-time copy of the series of images that are being displayed on display 104 of Device A, if the videocalling application supports screen sharing. The video stream can also be received by Device A from a remote source, for example, from an Internet server or from another electronic device.

Method 300 begins at step 302, where Device B receives, from Device A, data defining one or more output resolutions supported by Device A. The supported output resolutions data can include, for each supported output resolution, the following output-resolution parameters, for example: width, height, aspect ratio, and priority. In some embodiments, the aspect ratio parameter can be omitted because it can be calculated based on the width and the height parameters.

The priority parameter can indicate Device A's preference with regards to outputting the video stream using the particular resolution. For example, if the video to be streamed has already been recorded, compressed, and stored in memory 108 of Device A, it may be preferable to output the video stream in the resolution in which it is stored. Thus, scaling and/or recompressing the video—processes that consume power and deteriorate video quality—can be avoided. Likewise, if the video to be streamed is received from camera 108, Device A can give preference to those output resolutions that are also supported by camera 108. In some embodiments, however, priority information can be omitted.

In some embodiments, supported output resolution data can define one or more ranges of supported output resolutions. For example, a range of supported output resolutions can be defined by the following parameters: minimum width, maximum width, minimum height, maximum height, aspect ratio, and priority. Such a range can indicate to Device B, for example, that Device A can stream video using any resolution whose width is within the [minimum width, maximum width] range, whose height is within the [minimum height, maximum height] range, and whose aspect ratio is defined by the aspect ratio parameter. In some embodiments, supported output resolution data can define both ranges and discrete resolutions using the above set of parameters. For example, to define a discrete resolution, Device A can set the minimum width parameter to be equal to the maximum width parameter, and set the minimum height parameter to be equal to the maximum height.

At step 304, Device B determines input-resolution parameters for a preferred input resolution. In some embodiments, the preferred input resolution is determined based on the native resolution of display 104 of Device B. For example, the preferred input resolution can be equal to the native resolution. In some embodiments, other factors can also be included in the determination. For example, if the video stream will be displayed only on a portion of display 104 of Device B, the preferred input resolution can be chosen based on the size of that portion of the display. As another example, Device B can match the preferred input resolution to the communication speed between Device A and Device B, in order to allow for a smooth streaming without delays. For example, if Device B determines that the communication speed from Device A to Device B (as measured, for example, in bits per second) is too slow to transmit a stream at the native resolution, Device B can set the preferred input resolution to be lower than its native resolution, but with the same aspect ratio. For example, if the native resolution of Device B is 1024×768 and the video needs to be displayed on full screen, Device B can select the preferred resolution to be 1024×768, 512×384, or 256×192, if the communication speed is high, medium, or low, respectively. Another factor that can be considered in the determination of the preferred input resolution is the computational capabilities of Device B. For example, if the scaler and/or video decoder 114 of Device B can handle only a limited range of resolutions, such limitations could to be considered. In some embodiments, the determining step 304 can occur before the receiving step 302.

At step 306, Device B compares its preferred input resolution with the output resolutions supported by Device A. In some embodiments, Device B calculates a mismatch value between each supported output resolution and the preferred input resolution. The mismatch value reflects the degree of inconsistency between a given supported output resolution and the preferred input resolution. The mismatch value can be calculated based on disparities between the two resolutions in terms of width, height, aspect ratio, total area, and any other parameters associated with a resolution.

In some example embodiments, a resolution mismatch value is calculated as a linear combination of mismatches of the individual resolution parameters:

$$\text{Res\_mismatch} = a \times \text{height\_mismatch} + b \times \text{width\_mismatch} + c \times \text{aspect\_ratio\_mismatch}$$

where a, b, and c are predefined weights, and the individual parameter mismatches (height_mismatch, width_mismatch, and aspect_ratio_mismatch) are calculated, for example, as absolute differences or as ratios between the corresponding parameter of the supported output resolution and the corresponding parameter of the preferred input resolution. For example, a mismatch between resolutions 1024×768 and 1280×720 can be calculated as follows: Res_mismatch=1×|768−720|+1×|1024−1280|+200×|4/3−16/9|=392.

In some embodiments, a supported output resolution can be associated with a priority, as discussed above. In this case, the priority can also be taken into account in the mismatch calculation. For example, the priority can be defined as a number from 0 to 1 (1 being the highest priority), and added to the above formula, for example, with a negative weight d (e.g., d=300). In other embodiments, the priority can be inserted into the formula as a denominator, that is, the sum of the weighted parameter mismatches can be divided by the priority. Thus, higher priority can render lower mismatch values.

In some embodiments, Device B can be physically rotated by the user, causing display 104 to change orientation of displayed content from portrait to landscape or vice versa. In these embodiments, Device B can either determine its preferred input resolution based on its current orientation, or it can determine that both the current and the opposite orientations are equally "preferred" because the user can always rotate the device to match the displayed video orientation. For example, if the native resolution of Device B is 1024×768 when held in landscape orientation and 768×1024 when held in portrait orientation, and the device is currently being held in portrait orientation, Device B can choose to operate in one of two modes. In a first mode, Device B "assumes" that the current portrait orientation is fixed and will not be rotated during streaming. Therefore, in this mode, Device B can set one preferred input resolution: 768×1024. Consequently, Device A's supported output resolutions that are landscape oriented (i.e., their width is greater than their height) may not match well with the preferred input resolution. In other words, such resolutions from Device A will receive high mismatch values and may not be selected for streaming, as will be discussed below.

In a second mode, Device B "assumes" that the user will rotate the device into landscape orientation upon identifying a landscape-oriented video stream. Therefore, in this mode, Device B can have two equally-preferred input resolutions: 768×1024 and 1024×768, for example. Each of the two preferred input resolutions can then be matched with each of the supported output resolutions of Device A. Therefore, if one of the supported output resolutions is, for example, 800×600 (landscape), it may not match well (i.e., it may receive higher mismatch values using, for example, the formula provided above) with the portrait preferred resolution of 768×1024, but it will match relatively well (i.e., receive lower mismatch values) with the landscape preferred resolution of 1024×768, increasing its chances to be selected for streaming.

At step 308, Device B selects the supported output resolution whose mismatch with the preferred input resolution is the lowest. In some embodiments, instead of finding the lowest mismatch, Device B can calculate, at step 306, "similarity" values for the different resolutions, where similar resolutions render higher similarity values, and dissimilar resolutions render lower similarity values, and select, at step 308, the supported output resolution that results in the highest similarity value. In some embodiments, Device B can determine, at step 308, that some or all of the supported output resolutions cannot be selected. For example, Device B can determine that it is incapable of displaying streams received at some resolutions, due to limitations in scaling, video decoding, or other processing capabilities. In some embodiments, Device B discards supported output resolutions that cannot be displayed, and selects one of the remaining supported output resolutions, if any, based on the mismatch values they receive. If none of the supported output resolutions can be displayed, in some embodiments, Device B can reject Device A's offer, using any standard (e.g., SIP) or proprietary method.

At step 310, Device B transmits the selected output resolution to Device A, indicating that this resolution should be used during a streaming session. Device A, upon receiving the selected output resolution, can scale the video stream, if necessary, to match the selected output resolution, and can (optionally) compress the video stream using a video encoder (e.g., video encoder 106), thereby significantly reducing the video stream's bitrate and saving bandwidth across the communication between Device A and Device B.

At step 312, Device B begins receiving, from device A, a video stream having the selected output resolution. Device B can determine whether the stream has been compressed, and if so, Device B decompresses the stream using a video decoder (e.g., video decoder 114). Device B can also scale the decompressed stream, if necessary, before displaying it on a display (e.g., display 104). Some scaling may be required because, although the selected output resolution has the smallest mismatch with the preferred input resolution, there may still be some mismatch. Also, even if the match is absolute (e.g., the selected output resolution is exactly the same as the preferred input resolution), Device B can choose to display the stream at a resolution different from the preferred input resolution. For example, Device B could have determined, at step 304, that although the received stream would be displayed on its full screen, the network is so slow that it would be preferable to request the stream at a lower resolution and upscale it to the full native resolution after receipt.

In some embodiments, at step 310, Device B sends, in addition to the selected output resolution associated with the lowest mismatch, output resolutions associated with higher mismatches. For example, Device B can include, at step 310, a list of some or all supported output resolutions and indicate a new priority value for each output resolution, the priority values being inversely proportional to the mismatch value, for example. Accordingly, the top-priority resolution can be the one with the lowest mismatch value. Device A can then select the top-priority resolution for transmitting the video at step 312, and store the priority information related to the other resolutions for future use, for example, for future resolution selections.

Figure 4:
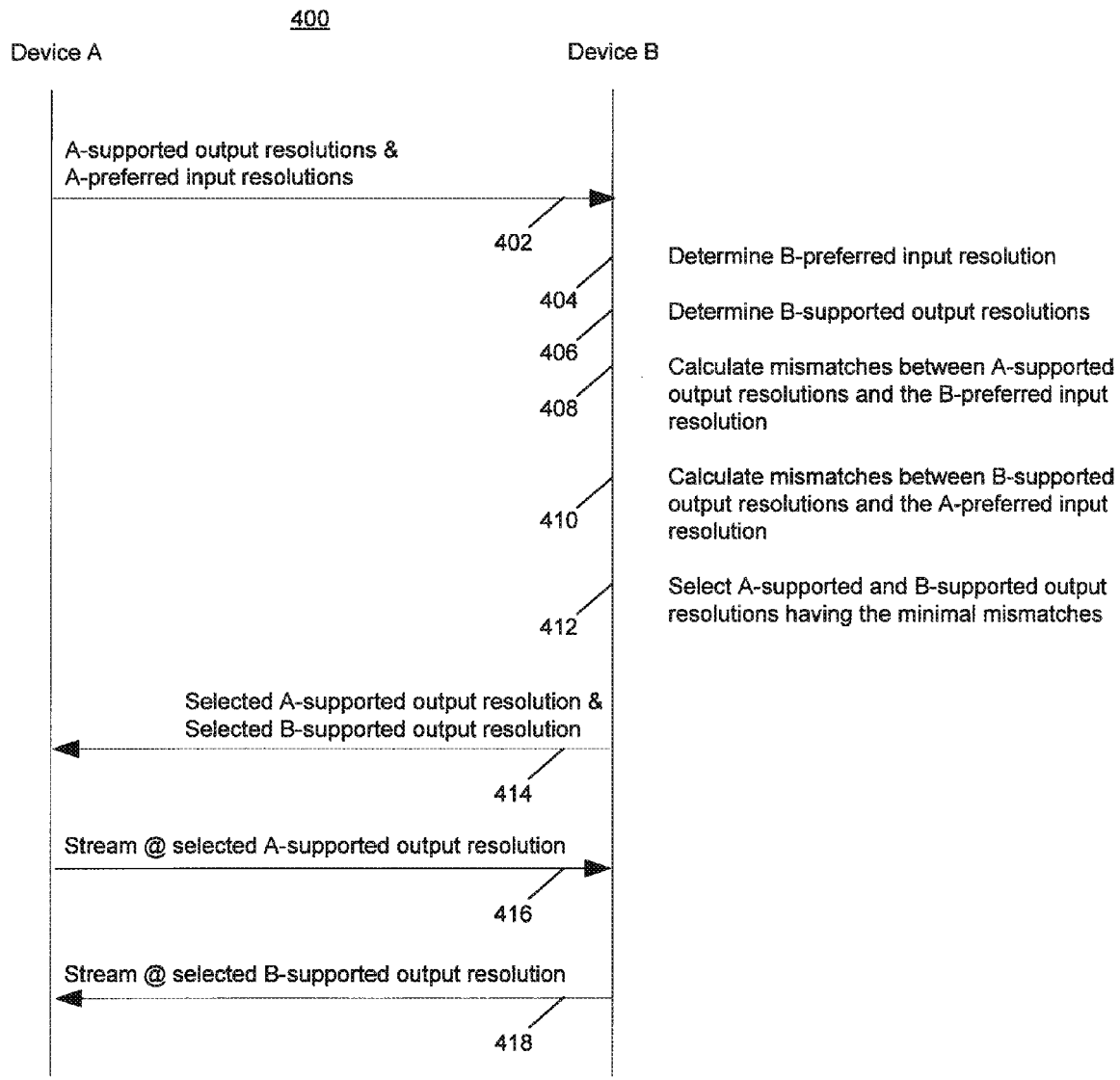
FIG. 4 is a time diagram of an example method for resolution selection in a two-way videocalling, consistent with embodiments disclosed herein.

FIG. 4 shows a time diagram of a resolution selection method 400 in a two-way videocalling, in accordance with an example embodiment. In this example, both Device A and Device B receive and transmit video streams. Method 400 begins at step 402 when Device B receives, from Device A, data defining one or more output resolutions supported by Device A (hereinafter, "A-supported output resolutions") as well as data defining one or more input resolutions preferred by Device A (hereinafter, "A-preferred input resolutions"). A-preferred input resolutions can be determined by Device A, for example, using similar considerations discussed above in connection with step 304 and Device B. A-supported output resolutions and A-preferred input resolutions can be transmitted as a list (or lists) of resolutions and/or ranges that are defined, for example, using parameters discussed above in connection with step 302.

At step 404, Device B determines its preferred input resolution (hereinafter, "B-preferred input resolution") using similar considerations to those discussed above in connection with step 304. As stated above, in some embodiments, the B-preferred input resolutions can be determined prior to receiving step 402. At step 406, Device B determines its one or more supported output resolutions ("B-supported output resolutions") using similar considerations to those discussed above in connection with step 302.

At step 408, Device B calculates mismatches between the B-preferred input resolution and the A-supported output resolutions using, for example, the same or similar formula discussed above in connection with step 306.

At step 410, Device B calculates mismatches between the A-preferred input resolutions and the B-supported output resolutions using, for example, the same or similar formula discussed above in connection with step 306. In some embodiments, multiple A-preferred input resolutions can be received from Device A at step 402. In this case, Device B can, for example, calculate mismatch values only between the top-priority A-preferred input resolution (as indicated by the "priority" parameter discussed above) and each of the B-supported output resolutions. Alternatively, Device B can calculate mismatch values between each A-preferred input resolution and each B-supported output resolution.

In some embodiments, priority information can exist for both the A-preferred input resolutions and the B-supported output resolutions. In this case, one or both priorities can be considered by the mismatch calculation formula.

At step 412, Device B selects the A-supported output resolution whose mismatch with the B-preferred input resolution was the lowest. Also at step 412, Device B selects the B-supported output resolution whose mismatch with any of the A-preferred input resolutions (if there are more than one) is the lowest. It will be understood that in some embodiments the selected A-supported and B-supported output resolutions can be different, while in other embodiments, they can be the same.

At step 414, Device B transmits the selected A-supported output resolution and (optionally) the selected B-supported output resolution to Device A, indicating that those resolutions should be used to transmit the video streams from Device A to Device B and from Device B to Device A, respectively.

At step 416, Device B begins receiving, from device A, a video stream having the selected A-supported output resolution. At step 418, which can occur before, after, or concurrently with step 416, Device B begins transmitting, to device A, a video stream having the selected B-supported output resolution.

In some embodiments, at step 414, Device B sends, in addition to the selected B-supported output resolution associated with the lowest mismatch, other B-supported output resolutions, for example, prioritized by the level of their mismatches with the A-preferred input resolutions.

At some point after the video streaming has begun, one of the electronic devices can determine that the media source of the streamed video is about to change. For example, during a videocalling, the user decides to stop transmitting video captured by the camera of his or her device, and to start sharing his screen (or vice versa). Changing of the video source can be associated with a delay caused by, for example, the need to restart a video encoder or by other implementation constraints. During this delay, the other participant may observe video corruption effects, such as a frozen image, black screen, etc.

In some embodiments, when an electronic device 100 that is sending a video stream (e.g., Device A in the example of FIG. 3, or either Device A or Device B in the example of FIG. 4) determines that a change in the video source (or some other change that can potentially corrupt the video stream) is about to occur (or has just occurred), the electronic device notifies the video-receiving device (e.g., Device B in the example of FIG. 3) about the upcoming interruption. Such notification allows the video-receiving device to make preparations to avoid or minimize the corruption effects. For example, the video-receiving device can pause the displayed stream, inform the user regarding the upcoming transition (e.g., using animation, a progress bar, etc.), and resume the video stream after the transition has been completed. In addition, the video-receiving device can also reject the transition, re-select the parameters (e.g., resolution) of the new stream, and pre-allocate resources required for decoding and displaying the new stream. In some embodiments, the video-receiving device upon receiving the notification can also begin rearranging the graphical user interface (GUI) displayed on a display 104 in accordance with the type of the new stream. For example, GUI required for a camera-based video stream (if any) can be different from GUI required for a screen-sharing video stream.

Figure 5:
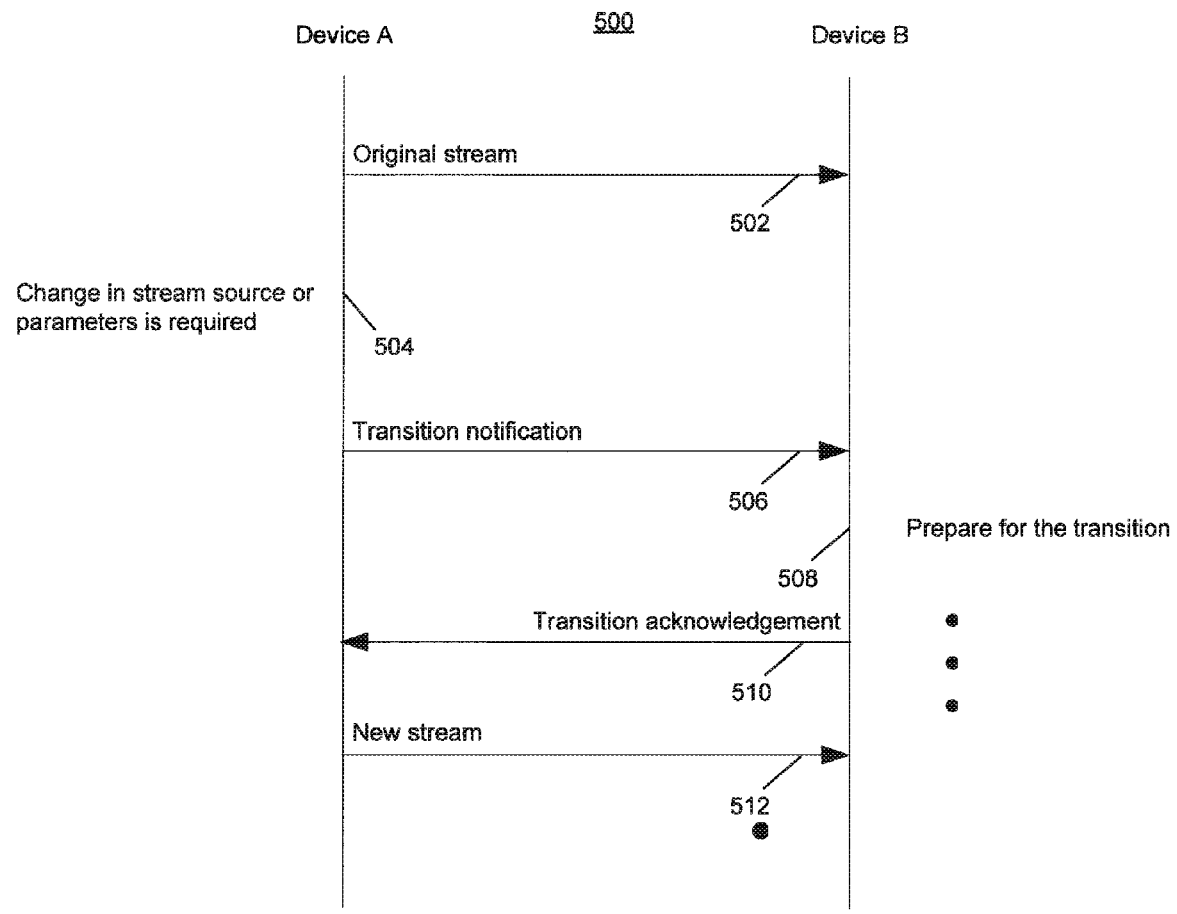
FIG. 5 is a time diagram of an example method of transition notification, consistent with embodiments disclosed herein.

FIG. 5 shows a time diagram of a transition notification method 500, in accordance with some embodiments. In this example, like in FIG. 3, Device A is the video-sending device and Device B is the video-receiving device. Method 500 begins at step 502, where Device A transmits an original video stream to Device B. During the transmission, Device A determines, at step 504, that a change in the stream's video source or video parameters is about to occur (e.g., requested by the user, or necessitated by a change in network conditions). After making the determination, Device A sends, at step 506, a transition notification to Device B, indicating the change in the video source or video parameters (e.g., resolution). In some embodiments, as part of the notification, Device A transmits to Device B supported output resolutions, thereby initiating a resolution re-selection process, such as resolution selection method 300 or resolution selection method 400. A change in the video source can require re-selection of the resolution because, for example, Device A can support different output resolutions for the new video source, or because Device B may choose to display the new media on a different portion of the screen.

At step 508, Device B, after receiving the transition notification, prepares for the transition. As discussed above, the preparations can include, for example, pausing the displayed stream, providing an appropriate indication to the user, rejecting the transition, pre-allocating resources for the decoding and presentation of the new stream, and so on. In some embodiments, Device B can also participate in resolution re-selection process (e.g., methods 300 or 400 described above), based on the new supported output resolutions received from Device A at step 506.

After finishing the necessary preparations, Device B transmits, at step 510, an acknowledgement of the transition to Device A, indicating that Device B is ready for the transition. In some embodiments, Device B also transmits, at step 510, the re-selected output resolution. After receiving the transition acknowledgement, Device A can begin sending the new stream to Device B. Because, in some embodiments, Device A must wait for the acknowledgement from Device B before it can switch the video sources, Device B can be guaranteed that the streams will not be switched until it finishes its preparations. Another advantage of requiring Device A to wait for the acknowledgment is that it provides means of resolving a potential "collision" in a two-way videocalling scenario, where both Device A and Device B decide to switch their video sources simultaneously.

It will be appreciated that in embodiments involving two-way videocalling, like those illustrated in FIG. 4, Device A and Device B are both video-receiving and video-sending devices. Therefore, in these embodiments, either or both of Device A and Device B can initiate transition notification method 500 described herein.

In some embodiments, all communications performed in methods 300, 400 and 500 described above can be implemented using the SIP protocol. For example, the initial offers sent in steps 302 and 402 can be implemented using SIP's INVITE request, and the answer returned in steps 310 and 314 can be implemented using SIP's INVITE response.

Similarly, the transition notification performed in step 506 can be implemented using a re-INVITE/UPDATE request, and the transition acknowledgment performed in steps 510 can be implemented using a re-INVITE/UPDATE response. Specific information indicating that a video source is changing, with any relevant details regarding the new media, can be included in the proprietary header of the re-INVITE/UPDATE request.

Any resolution data exchanged between the devices (e.g., supported resolutions, preferred resolutions, selected resolution, etc.) can be included in the body of the SIP messages, and can be encoded, for example, using the Session Description Protocol (SDP) format described in RFC 2327 with SDP image attribute parameters described in RFC 6236. In some embodiments, specific information indicating that a video source is changing can also be included within the body of the SIP message, for example, within the SDP image attribute parameters.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While the examples provided above illustrate resolution selection methods between two devices, it will be appreciated that in some embodiments, the resolution selection methods can be performed between more than two devices. For example, Device A can send (e.g., at step 302) its supported output resolutions to several electronic devices. Each electronic device can respond (e.g., at step 310) with its selected resolution, as well as other, lower-priority, resolutions. Device A can then analyze all the responses, and based on the responses, find a resolution with, for example, the lowest average mismatch among all the electronic devices. Device A can then, for example, ignore the received selected resolutions, and send (e.g., at step 312) a video stream configured based on the found resolution with the lowest average mismatch. Alternatively, Device A can send a new "offer" (i.e. a new list of supported resolutions) based on the found resolution with the lowest average mismatch, allowing the other electronic devices to respond with a new set of selected resolutions. In some embodiments, the offer can contain, for example, only one resolution (e.g., the resolution with the lowest average mismatch), in which case, the electronic devices may be limited to either rejecting the offer or selecting the only offered resolution for streaming.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other embodiments will be apparent to those skilled in the art from consideration of the specification and practice of the embodiments disclosed herein. It is intended that the specification and examples be considered as examples only.

What is claimed is:

1. A method comprising:
   determining input-resolution parameters for an input resolution;
   receiving first and second output resolutions from an electronic device, wherein the first output resolution includes first output-resolution parameters and the second output resolution includes second output-resolution parameters;

calculating a first value by using the input-resolution parameters and the first output-resolution parameters;

calculating a second value by using the input-resolution parameters and the second output-resolution parameters;

selecting one of the first and second output resolutions based on a comparison between the first and second values;

providing the selected output resolution to the electronic device; and receiving a video stream from the electronic device, wherein the video stream has a resolution corresponding to the selected output resolution.

2. The method of claim 1, wherein calculating the first value comprises comparing an aspect ratio of the input resolution with an aspect ratio of the first output resolution, and calculating the second value comprises comparing an aspect ratio of the input resolution with an aspect ratio of the second output resolution.

3. The method of claim 1, wherein the first output-resolution parameters include a first priority, the second output-resolution parameters include a second priority, and wherein the first value is calculated based at least on the first priority, and the second value is calculated based at least on the second priority.

4. The method of claim 1, wherein the first and second values reflect a degree of mismatch between the input resolution and the first and second output resolutions, respectively, and wherein selecting one of the first and second output resolutions comprises selecting an output resolution associated with the lower degree of mismatch.

5. The method of claim 4, wherein the degree of mismatch is calculated based on a weighted sum of one or more parameter mismatches, wherein each parameter mismatch reflects the difference between one of the input-resolution parameters and a corresponding one of the output-resolution parameters of the one of the first and second output resolutions.

6. The method of claim 1, wherein the first and second values reflect a degree of similarity between the input resolution and the first and second output resolutions, respectively, and wherein selecting one of the first and second output resolutions comprises selecting an output resolution associated with the higher degree of similarity.

7. The method of claim 1, further comprising displaying the received video stream on a display.

8. The method of claim 7, wherein the input-resolution parameters are determined based at least on a native resolution and an orientation of the display.

9. The method of claim 1, further comprising:
receiving, from the electronic device, remote input-resolution parameters for a remote input resolution;
determining third and fourth output resolutions, wherein the third output resolution includes third output-resolution parameters and the fourth output resolution includes fourth output-resolution parameters;
calculating a third value by using the remote input-resolution parameters and the third output-resolution parameters;
calculating a fourth value by using the remote input-resolution parameters and the fourth output-resolution parameters;
selecting one of the third and fourth output resolutions based on a comparison between the third and fourth values; and
sending a second video stream to the electronic device, wherein the second video stream has a resolution corresponding to the selected one of the third and fourth output resolutions.

10. The method of claim 9, wherein the remote input-resolution parameters are received from the electronic device together with the first and second output resolutions.

11. A method comprising:
sending a video stream from a first electronic device to second electronic device;
receiving a user request at the first electronic device to change the video stream;
sending, to the second electronic device, a notification associated with the user request;
receiving, from the second electronic device, an acknowledgement associated with the notification; and
after receiving the acknowledgement from the second electronic device, sending a new video stream to the second electronic device.

12. The method of claim 11, further comprising:
sending, to the second electronic device, a plurality of output resolutions;
receiving, from the second electronic device, a selected output resolution from the output resolutions; and
configuring the new video stream to correspond to the selected output resolution.

13. A first electronic device comprising:
a display configured to show a video stream; and
one or more processors communicatively coupled to the display, wherein the one or more processors are configured to:
determine input-resolution parameters for an input resolution;
receive first and second output resolutions from a second electronic device, wherein the first output resolution includes first output-resolution parameters and the second output resolution includes second output-resolution parameters;
calculate a first value by using the input-resolution parameters and the first output-resolution parameters;
calculate a second value by using the input-resolution parameters and the second output-resolution parameters;
select one of the first and second output resolutions based on the comparison between the first and second values;
provide the selected output resolution to the second electronic device; and
receive a video stream from the second electronic device, wherein the video stream has a resolution corresponding to the selected output resolution.

14. The first electronic device of claim 13, wherein calculating the first value comprises comparing an aspect ratio of the input resolution with an aspect ratio of the first output resolution, and calculating the second value comprises comparing an aspect ratio of the input resolution with an aspect ratio of the second output resolution.

15. The first electronic device of claim 13, wherein the first output-resolution parameters include a first priority, the second output-resolution parameters include a second priority, and wherein the first value is calculated based at least on the first priority, and the second value is calculated based at least on the second priority.

16. The first electronic device of claim 13, wherein the first and second values reflect a degree of mismatch between the input resolution and the first and second output resolutions, respectively, and wherein selecting one of the first and second output resolutions comprises selecting an output resolution associated with the lower degree of mismatch.

17. The first electronic device of claim 16, wherein the degree of mismatch is calculated based on a weighted sum of one or more parameter mismatches, wherein each parameter mismatch reflects the difference between one of the input-resolution parameters and a corresponding one of the output-resolution parameters of the one of the first and second output resolutions.

18. The first electronic device of claim 13, wherein the first and second values reflect a degree of similarity between the input resolution and the first and second output resolutions, respectively, and wherein selecting one of the first and second output resolutions comprises selecting an output resolution associated with the lower degree of similarity.

19. The first electronic device of claim 13, wherein the one or more processors are further configured to display the received video stream on the display.

20. The first electronic device of claim 19, wherein the input-resolution parameters are determined based at least on a native resolution and an orientation of the display.

21. The first electronic device of claim 13, wherein the one or more processors are further configured to:
　　receive, from the second electronic device, remote input-resolution parameters for a remote input resolution;
　　determine third and fourth output resolutions, wherein the third output resolution includes third output-resolution parameters and the fourth output resolution includes fourth output-resolution parameters;
　　calculate a third value by using the remote input-resolution parameters and the third output-resolution parameters;
　　calculate a fourth value by using the remote input-resolution parameters and the fourth output-resolution parameters;
　　select one of the third and fourth output resolutions based on the comparison between the third and fourth values; and
　　send a second video stream to the second electronic device, wherein the second video stream has a resolution corresponding to the selected one of the third and fourth output resolutions.

22. The first electronic device of claim 21, wherein the remote input-resolution parameters are received from the second electronic device together with the first and second output resolutions.

23. A first electronic device comprising:
　　a display; and
　　one or more processors communicatively coupled to the display, wherein the one or more processors are configured to:
　　　　send a video stream to a second electronic device;
　　　　receive a user request at the first electronic device to change the video stream;
　　　　send, to the second electronic device, a notification associated with the user request;
　　　　receive, from the second electronic device, an acknowledgement associated with the notification; and
　　　　after receiving the acknowledgement from the second electronic device, send a new video stream to the second electronic device.

24. The first electronic device of claim 23, wherein the one or more processors are further configured to:
　　send, to the second electronic device, a plurality of output resolutions;
　　receive, from the second electronic device, a selected output resolution from the output resolutions; and
　　configure the new video stream to correspond to the selected output resolution.

\* \* \* \* \*